United States Patent
Kwon et al.

(10) Patent No.: US 8,406,333 B2
(45) Date of Patent: Mar. 26, 2013

(54) METHOD FOR TRANSMITTING SIGNAL IN MULTIPLE ANTENNA SYSTEM

(75) Inventors: Yeong Hyeon Kwon, Anyang-si (KR); Min Seok Noh, Anyang-si (KR); Sung Ho Moon, Anyang-si (KR); Dong Cheol Kim, Anyang-si (KR); Jin Sam Kwak, Anyang-si (KR); Hyun Woo Lee, Anyang-si (KR); Seung Hee Han, Anyang-si (KR)

(73) Assignee: LG Electronics Inc., Seoul (KR)

( * ) Notice: Subject to any disclaimer, the term of this patent is extended or adjusted under 35 U.S.C. 154(b) by 331 days.

(21) Appl. No.: 12/739,713

(22) PCT Filed: Nov. 12, 2008

(86) PCT No.: PCT/KR2008/006662
§ 371 (c)(1),
(2), (4) Date: Jul. 28, 2010

(87) PCT Pub. No.: WO2009/064108
PCT Pub. Date: May 22, 2009

(65) Prior Publication Data
US 2010/0284477 A1    Nov. 11, 2010

Related U.S. Application Data

(60) Provisional application No. 60/988,088, filed on Nov. 14, 2007.

(30) Foreign Application Priority Data

Feb. 4, 2008   (KR) ........................ 10-2008-0011197

(51) Int. Cl.
*H04B 7/02* (2006.01)

(52) U.S. Cl. ........ 375/267; 375/260; 375/262; 375/265; 375/295; 375/299; 375/340; 375/343; 375/346; 375/347

(58) Field of Classification Search ................. 375/260, 375/267, 262, 265, 295, 299, 316; 370/203, 370/204, 205, 208, 209, 210
See application file for complete search history.

(56) References Cited

U.S. PATENT DOCUMENTS

| | | |
|---|---|---|
| 7,002,900 B2 | 2/2006 | Walton et al. |
| 7,197,084 B2 | 3/2007 | Ketchum et al. |

(Continued)

FOREIGN PATENT DOCUMENTS

| | | |
|---|---|---|
| KR | 10-2004-0032985 A | 4/2004 |
| KR | 10-2004-0089748 A | 10/2004 |

(Continued)

*Primary Examiner* — Dhaval Patel
(74) *Attorney, Agent, or Firm* — Birch, Stewart, Kolasch & Birch, LLP

(57) ABSTRACT

A signal transmission method in a multiple antenna system is described. The signal transmission method includes, upon receiving channel state information from a receiving end, estimating a channel according to the channel state information, determining a precoding matrix according to the estimated channel and modifying the signal of the transmitting end using the precoding matrix in a process of mapping a symbol of the signal to a subcarrier, and transmitting the signal to the receiving end. According to the present invention, pre-equalization of a transmission signal can cause a receiving end to perform coherent combination, reduce pilot density by decreasing unnecessary pilots, and reduce interference within a cell or between cells.

8 Claims, 4 Drawing Sheets

U.S. PATENT DOCUMENTS

| | | |
|---|---|---|
| 2004/0081254 A1* | 4/2004 | Tirkkonen ............... 375/299 |
| 2005/0122998 A1 | 6/2005 | Kamerman et al. |
| 2006/0056528 A1 | 3/2006 | Jung et al. |
| 2007/0041457 A1* | 2/2007 | Kadous et al. ............ 375/260 |
| 7,974,371 B2* | 7/2011 | Murakami et al. ......... 375/347 |
| 8,018,893 B2* | 9/2011 | Sartori et al. ............. 370/329 |
| 8,165,189 B2* | 4/2012 | Liu et al. ................. 375/220 |
| 2003/0021795 A1 | 1/2003 | Houston et al. |
| 2003/0185310 A1* | 10/2003 | Ketchum et al. .......... 375/259 |

FOREIGN PATENT DOCUMENTS

| | | |
|---|---|---|
| KR | 10-2005-0056152 A | 6/2005 |
| KR | 10-2005-0060105 A | 6/2005 |
| KR | 10-2006-0023863 A | 3/2006 |

\* cited by examiner

METHOD FOR TRANSMITTING SIGNAL IN MULTIPLE ANTENNA SYSTEM

This Non-Provisional application is the National Phase of PCT/KR2008/006662 filed on Nov. 12, 2008, which claims priority under 35 U.S.C. 119(e) to U.S. Provisional Application No. 60/988,088 filed on Nov. 14, 2007 and under 35 U.S.C. 119(a) to Patent Application No. 10-2008-0011197 filed in Korea on Feb. 4, 2008, all of which are hereby expressly incorporated by reference into the present application.

TECHNICAL FIELD

The present invention relates to a signal transmission method in a multiple antenna system, and more particularly, to a signal transmission method for modifying a transmission signal considering a channel state or transmitting additional information to cause a receiving end to easily estimate a channel.

BACKGROUND ART

A synchronization process in a communication system is divided into a cellular network and a private network. The cellular network absolutely determines the time when a transmission packet should be transmitted to operate a system, and the private network permits arbitrary timing. The cellular network is a commercial network that should transmit data efficiently with bands allocated to multiple users and should save frequency/time resources as much as possible. However, in the case of a wireless local area network (LAN), a wireless personal area network (PAN), or Ethernet, in which importance of resources is not great, transmission and reception timing is not restricted. That is, a receiving end receives a packet at a start point of a packet determined by a transmitting end and transmits a response at transmission timing thereof. In other words, in a synchronization process of the transmitting and receiving ends, it is necessary to search only the start point of the packet transmitted by the transmitting end. However, in the cellular network, all terminals can transmit a packet simultaneously and a packet should be transmitted at a specific time point of a network which is to be accessed by the terminals in order to access the network while reducing interference between the terminals. To this end, a synchronization process is required. A base station transmits a reference time for synchronization through a synchronization channel and terminals confirm a reference time of a system through the synchronization channel. A random access channel (RACH) is a region in which a terminal disregards ambiguity caused by a physical distance thereof and can transmit a signal received by a base station. Through this physical channel, the base station receives a signal from the terminal and permits searched terminals to access a network.

A channel for a base station to receive a random access signal is defined as an RACH in the $3^{rd}$ generation partnership project (3GPP) long term evolution (LTE) and as a ranging channel in IEEE 802.16. A signal transmitted to such a channel uses Zadoff-Chu constant amplitude zero autocorrelation (CAZAC) in the 3GPP LTE and uses a pseudo-noise (PN) sequence in the IEEE 802.16. When a terminal accesses an RACH, the terminal selects one of three predetermined sequences and transmits the selected sequence at a determined time. A base station searches the three sequences. If the base station determines that a received signal is present, the base station broadcasts a response to a corresponding sequence ID.

A signal transmitted by a transmitting end is distorted by a channel between the transmitting end and a receiving end and then is transmitted to the receiving end. At a time point when this signal is detected, signals transmitted by multiple mobile stations are simultaneously discovered. In this case, performance is determined based on a signal structure used as random access. However, such detection performance increases interference between signals while a characteristic of the signal structure is deteriorated according to an influence of a channel.

The following Equation 1 indicates a signal at a receiving end due to an influence of a channel.

$$Rx = Ha \times Sa + Hb \times Sb \qquad \text{[Equation 1]}$$

If a signal Sa of a transmitting end A and a signal Sb of a transmitting end B are received at a receiving end, the receiving end receives a signal indicated in Equation 1 due to an influence of a channel.

Each sequence and correlation are expressed as illustrated in Equation 2.

$$Da = Ha \times Rsa + Hb \times Sb \times Sa \qquad \text{[Equation 2]}$$

In Equation 2, Rsa denotes autocorrelation of a sequence Sa and indicates a function having a value of 1 at a specific point, that is, a point in which a timing error is 0. Accordingly, if an influence caused by a channel does not exist, then Da=1+delta has a characteristic of a form desired by the sequence. However, if the influence caused by the channel remains, performance is deteriorated by an interference term of Equation 2. To prevent deterioration in performance, signals in a frequency or time region can be discriminated so that an influence of the interference term of Equation 2 can be reduced. To reduce the interference in LTE, a method for varying a root sequence while using other random access sequences and a method for expressing a channel response in different regions using cyclic shift are considered. However, in IEEE 802.16 using a PN sequence, interference in a time region is not reduced and only signals can be discriminated by cross correlation by varying a root index.

DISCLOSURE

Technical Problem

An object of the present invention devised to solve the problem lies in providing a signal transmission method for generating and transmitting a signal by a transmitting end such that timing ambiguity between the transmitting end and a receiving end and interference between multiple devices can be minimized in a communication system.

Technical Solution

The object of the present invention can be achieved by providing a signal transmission, including, upon receiving channel state information from a receiving end, estimating a channel according to the channel state information, determining a precoding matrix according to the estimated channel and performing pre-equalization by modifying the signal of the transmitting end using the precoding matrix in a process of mapping a symbol of the signal to a subcarrier, and transmitting the signal to the receiving end.

The performing of pre-equalization may adjust a phase of the signal so that a phase difference between signals of channels caused by the multiple antennas can be minimized.

The signal of the transmitting end may be a random access signal. The estimated channel may be one of a random access channel or a ranging channel.

The performing of pre-equalization may add at least one pilot information of a pilot symbol and a pilot sequence to the signal of the transmitting end, when the number of antennas of the receiving end is larger than the number of antennas of the transmitting end.

The estimating of the channel may estimate a channel according to reciprocity between an uplink channel and a downlink channel of a time division duplex (TDD) system.

In another aspect of the present invention, provided herein is a signal transmission method, including adding at least one pilot information of a pilot symbol and a pilot sequence to a signal of the transmitting end, and transmitting the added pilot information through at least one of an I channel and a Q channel together with the signal.

The adding of the pilot information may add the pilot symbol to the signal of the transmitting end when the signal is comprised of a symbol unit.

The adding of the pilot information may add pilot symbols of a number corresponding to a value obtained by subtracting the number of antennas of the transmitting end from the number of antennas of the receiving end, when the pilot symbol is added to the signal of the transmitting end.

The adding of the pilot information may add pilot sequences proportional to the number of antennas of the transmitting end, when the pilot sequence is added to the signal of the transmitting end.

The adding of the pilot information may map the pilot sequence to a specific constellation when the pilot sequence is added to the signal of the transmitting end.

The signal of the transmitting end may be a random access signal. The estimated channel may be one of a random access channel or a ranging channel.

In a further aspect of the present invention, provided herein is a signal transmission method, including selecting a part of constellations used in the receiving end with respect to a signal of the transmitting end, mapping the signal of the transmitting end to the selected constellations, and transmitting the mapped signal to the receiving end.

The transmitting end may use binary phase shift keying (BPSK) modulation and the receiving end may use quadrature phase shift keying (QPSK) modulation.

The selecting of the constellations may select constellations of a number corresponding to a modulation mode of the transmitting end.

The mapping of the signal of the transmitting end may include, upon receiving channel state information from the receiving end, determining a precoding matrix according to channel state information and modifying the signal using the precoding matrix.

Advantageous Effects

According to exemplary embodiments of the present invention, a transmission signal is pre-equalized, additional information for channel estimation is included, or a structure of the transmission signals is modified, thereby causing a receiving end to perform coherent combination, reducing pilot density by decreasing an unnecessary pilot, and reducing interference within a cell or between cells.

DESCRIPTION OF DRAWINGS

The accompanying drawings, which are included to provide a further understanding of the invention, illustrate embodiments of the invention and together with the description serve to explain the principle of the invention.

In the drawings.

BEST MODE

Reference will now be made in detail to the exemplary embodiments of the present invention with reference to the accompanying drawings. The detailed description, which will be given below with reference to the accompanying drawings, is intended to explain exemplary embodiments of the present invention, rather than to show the only embodiments that can be implemented according to the invention.

A transmitting end and a receiving end having multiple antennas, as will be described hereinbelow, include one device having multiple antennas, multiple devices having a singe antenna, and the like, and correspond to the case of virtual multiple-input multiple-output (MIMO) or collaborative MIMO.

Figure 1:
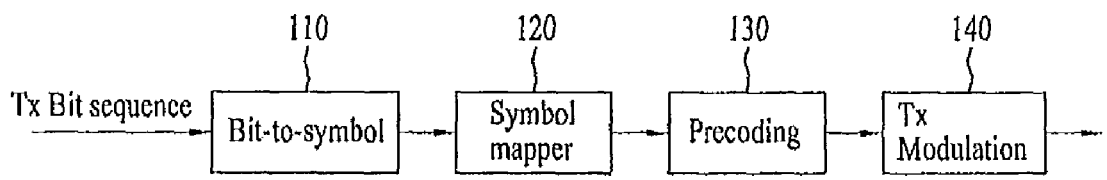
FIG. 1 illustrates a process of generating a modulation signal from a bit sequence.

FIG. 1 illustrates a process of generating a modulation signal from a bit sequence.

Referring to FIG. 1, a bit-to-symbol block 110 converts a bit sequence into a symbol. A symbol mapper 120 maps a transmission symbol to a combination of specific constellations. A precoding block 130 controls a channel or pilot information. A modulation block 140 modulates a precoded signal into a transmission signal to a receiving end. After such a transmission signal is generated, different terminals transmit the generated signal through an I channel and a Q channel. If a structure of the transmission symbol is determined as quadrature phase shift keying (QPSK) or more, a transmitting end may generate and transmit a signal as a subset of a specific constellation.

The same terminal may transmit a signal using the I channel and the Q channel simultaneously in order to improve detection performance of a ranging sequence. At this time, the transmitting end transmits the same sequence or different sequences through the I channel and the Q channel for channel information compensation, and the receiving end detects the sequences. Various sequences used by the same terminal may be general sequences including a modified sequence of the same sequence. In this case, a pre-equalization process may be omitted. Therefore, a diversity gain can be obtained and the reliability of signal detection can be improved.

In such a transmission method, additional information can be transmitted in an initial network access process. Then, since terminal information or priority information can be transmitted as in a duplex method, the transmission method can be utilized in various ways such as emergency environment, priority channel allocation demand, etc. In an IEEE 802.16e-based system, the above transmission method is used for bandwidth request, handover, periodic ranging, etc. through the same sequence, thereby improving reliability. Moreover, a priority channel may be allocated through the additional information, the additional information may be transmitted while requesting scheduling such as a buffer size, and information necessary for a handover process may be transmitted.

If the number of receive antennas is two or more, an added sequence may be used as a pilot. Then the receiving end can perform coherent detection between multiple antennas. Although the added sequence may be limited to a specific I channel or Q channel, if the additional information is included, the added sequence may be added to an arbitrary I channel or Q channel.

An orthogonal frequency division multiplexing (OFDM)-based signal is generally generated by carrying data in a frequency region. A bit sequence to be transmitted is converted into a symbol sequence and the symbol sequence is mapped to a subcarrier according to a predetermined rule.

According to the present invention, during or after a process of mapping the symbol to the subcarrier, channel variation is compensated for or a received constellation is controlled to be located at a specific position.

An exemplary embodiment of the present invention is to adjust a form of a received signal by modifying a signal by a specific method before transmission. This may be a sort of pre-equalization. Since a signal received at a receiving end may be subject to an influence of a channel, a transmitted signal may be previously modified based on the channel. To previously compensate for the channel, the transmitting end may receive feedback channel information from the receiving end. In case of time division duplex (TDD), channel estimation may be performed using reciprocity of channels.

The exemplary embodiment of the present invention includes a process of adjusting a signal of the transmitting end so that the signal has a specific form at the receiving end. The signal may include data or a control channel as well as a random access signal.

Figure 2:
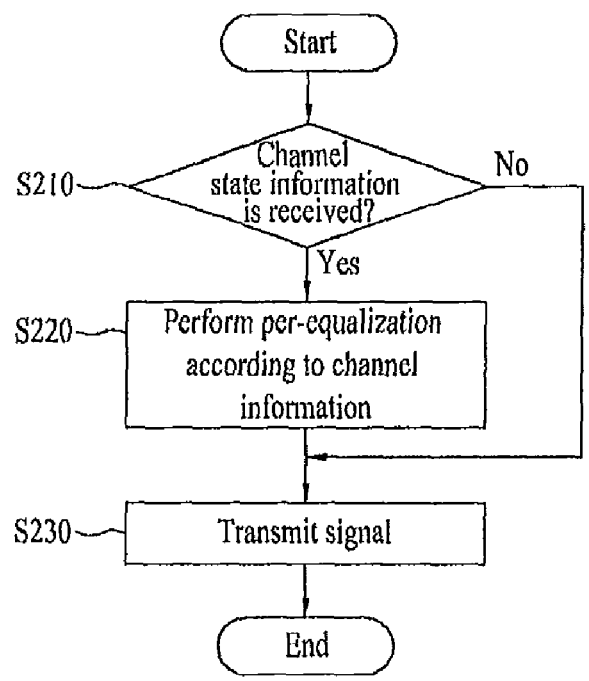
FIG. 2 is a flow chart illustrating a signal transmission method according to an exemplary embodiment of the present invention.

FIG. 2 is a flow chart illustrating a signal transmission method according to an exemplary embodiment of the present invention.

First, it is determined whether channel state information is received (step S210). If no channel state information is received, a signal is transmitted without performing pre-equalization (step S230).

If the channel state information is received, a channel is estimated according to the channel state information and a precoding matrix is determined according to the estimated channel. Next, in a process of mapping a symbol of the signal of the transmitting end to a subcarrier, pre-equalization of the signal of the transmitting end is performed using the precoding matrix (step S220). The pre-equalization corresponds to an example of modifying the signal of the transmitting end but the present invention is not limited thereto.

When transmitting a random access sequence, the pre-equalization is performed such that a reception signal looks like a delta function in which the sequence may have a specific feature, that is, cross-correlation is minimized and auto-correlation is maximized. In random access, more accurate processing can be performed to adjust synchronization of a transmitting end and a receiving end so that interference between random access signals of multiple transmitting ends can be minimized while signals generated at the transmitting end do not collide. If the transmitting end specially modifies a signal which is to be processed at the receiving end, an initially designed characteristic of a sequence can be maintained, and collision or interference can be reduced even when an influence caused by a channel occurs or different terminals use the same sequence.

In the exemplary embodiment of the present invention, a signal of the transmitting end is modified so as to lower interference between multiple signals when the receiving end receives the random access signal. This method may be applied to an arbitrary transmission signal as well as the random access signal.

Finally, the pre-equalized signal is transmitted to the receiving end through multiple antennas (step S230).

In another exemplary embodiment of the present invention, pilot information is added to a signal of a transmission end when a signal is transmitted to a receiving end that has more antennas than the transmitting end.

Figure 3:
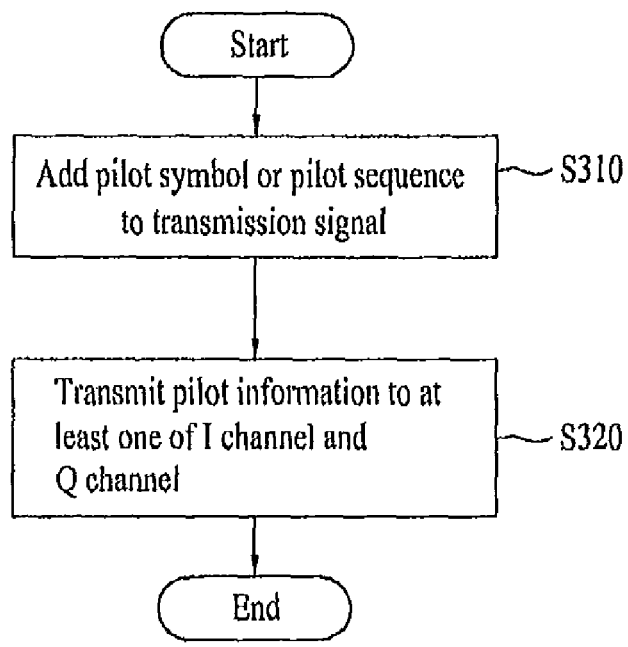
FIG. 3 is a flow chart illustrating a signal transmission method according to another exemplary embodiment of the present invention.

FIG. 3 is a flow chart illustrating a signal transmission method according to another exemplary embodiment of the present invention.

At least one pilot information of a pilot symbol and a pilot sequence is added to a signal of a transmitting end (step S310).

The added pilot information is transmitted through at least one of an I channel and a Q channel together with the signal of the transmitting end (step S320).

Another embodiment of the present invention may be applied even when a signal is modified by a predetermined method. Namely, when transmission of a signal is simply divided into an I channel and a Q channel, if one transmitting end uses the I channel, another transmitting end uses only the Q channel. Meanwhile, a reception signal equalized with respect to a corresponding channel at the transmitting end may be divided into the I channel and the Q channel at the receiving end.

A detailed description will be given hereinbelow.

A method for compensating for a channel may vary with antenna configurations of the transmitting and receiving ends.

In case of a diversity-based antenna configuration, that is, if the receiving end has N antennas (where N is greater than 1) and the transmitting end has one antenna, N antenna paths are present. The receiving end estimates N channels to restore signals received through N antennas, compensates for the channels, and adds the signals. For channel estimation, if the transmitting end transmits pilot information, the receiving end estimates the channels by comparing the pilot information with the signals received through the antennas. In this case, channel estimation for antennas and coherent combination of the received signals do not cause any problems.

If the pilot information is not transmitted together with the transmission signal, that is, if one of three specific sequences is selectively transmitted, the receiving end can not determine which sequence is transmitted and can not estimate the channels for the antennas. Furthermore, it is difficult to detect the signals by a coherent method. If a channel up to the N antennas of the receiving end based on a single subcarrier is $h_i$, a phase difference of each signal should be removed for coherent combination of the signals received through the N antennas. That is, channel estimation as indicated in Equation 3 is an optimal value.

$$H_{coh} = |h_1| + |h_2| + \ldots + |h_N| \qquad \text{[Equation 3]}$$

It is difficult to receive one signal transmitted through one subcarrier using a single frequency/time bin/space, that is, one antenna as indicated in Equation 3.

Inclusion of a minimum pilot for channel estimation improves overall performance. Namely, the performance of the receiving end can be improved by adding a pilot above a prescribed level as compared with not using a pilot in ranging as in a current IEEE 802.16 system.

If the receiving end has one antenna and the transmitting end has M antennas, although M channels are generated, the receiving end has only a signal adding the M channels. In other words, the receiving end receives only a signal adding the M channels unless the receiving end processes a reception signal to have M degrees of freedom by allocating resources such as frequencies/time/codes in order to discriminate M signals. This phenomenon may occur even in uplink as well as downlink, as in a cellular system. If reciprocity of channels as in a time division multiplexing (TDM) system is assumed or channel state information is fed back, signals transmitted through the respective antennas are previously compensated for. That is, if channels up to a receive antenna from the respective antennas are $h_1, h_2, \ldots, h_M$, transmission signals are previously pre-equalized and then are transmitted. Then an optimal signal is received at the receiving end. Namely, since a signal is transmitted through M ideal channels to the receive antenna, M times of a signal-to-noise (SNR) gain can be obtained.

However, using different powers for subcarriers at the transmitting end is not desirable. Specifically, if a power is allocated using an inverse of a channel for a deep fading part in order to previously compensate for the channel, as in pre-equalization, a probability of violating a regulatory spectral mask is high. Therefore, the transmitting end can control only a minimum power. Alternatively, a phase of a transmission signal may previously be varied so that a channel between each antenna and the receiving end may be a real channel or have a specific phase value, without controlling a power spectral density. The phase variance can be easily obtained and a signal received at the receiving end appears as illustrated in Equation 4.

$$H_{eq} \times s = (|h_1| + |h_2| + \ldots + |h_M|) \times s \qquad \text{[Equation 4]}$$

This reception signal has a diversity gain as in coherent detection.

Meanwhile, the case where the transmitting end has M antennas and the receiving end has N antennas will now be described. If M and N are the same number, the transmitting and receiving ends are related to full rank and compensation at the transmitting end considers modification of the full rank channel. If a signal set $s_T$ to be transmitted to each antenna is $[s_1, s_2, \ldots, s_M]$ and a reception signal set $s_R$ is $[r_1, r_2, \ldots, r_N]$, a relationship therebetween is expressed with respect to one subcarrier as indicated in Equation 5.

$$s_R = H \times s_T \qquad \text{[Equation 5]}$$

H denotes a channel matrix, and a constituent element H(i, j) denotes a channel from an i-th receive antenna to a j-th transmit antenna. If a pilot is not included in $s_T$, the receiving end can not estimate a channel. Therefore, compensation for a transmission signal is required and a compensated signal $s'_T$ is as indicated in Equation 6.

$$s'_T = H_{pre} \times s_T \qquad \text{[Equation 6]}$$

$H_{pre}$ denotes a precoding matrix that is combined with a channel matrix H so that a received signal can have a specific form. A matrix $H_{rx}$ generated by a combination of these two matrices becomes $H \times H_{pre}$. The precoding matrix $H_{pre}$ may be set such that received signals can be easily combined or an SNR is maximized. If the receiving end desires to perform coherent combination for $s_T$, the combined matrix $H_{rx}$ may have a form illustrated in Equation 7.

$$H_{rx} = \text{diag}\{\exp(j\theta_1)\exp(j\theta_2)\ldots\exp(j\theta_M)\} \qquad \text{[Equation 7]}$$

In Equation 7, $\theta_i$ may be the same value. In an actual system, since subcarrier power spectrum density may be influenced by a regulation mask according to the precoding matrix $H_{pre}$, it can not be assumed that a signal of uniform power is received as indicated in Equation 7.

A channel matrix at the receiving end may be expressed in the form of an already known value $\theta_i$ and an unknown power factor, as illustrated in Equation 8.

$$H_{rx} = \text{diag}\{r_1 \times \exp(j\theta_1) r_2 \times \exp(j\theta_2) \ldots r_M \times \exp(j\theta_M)\} \qquad \text{[Equation 8]}$$

Therefore, a constituent element of the precoding matrix $H_{pre}$ can be designed while adjusting $r_i$ so as to satisfy a power spectrum density criterion of the transmitting end, namely, a condition that transmission power levels at all antennas should be the same, with respect to $\theta_i$ received from the receiving end.

Such a design can be used when channel state information is shared between the transmitting and receiving ends or when a channel is estimated from reciprocity thereof as in TDD.

If the number of transmit antennas is less than the number of receive antennas (M<N), the precoding matrix $H_{pre}$ at the transmitting end can not satisfy the condition of all $\theta_i$ of the receiving end. Then $\theta_i$ of a reception signal at the receiving end with respect to a degree of freedom of a rank M can be adjusted through the precoding matrix $H_{pre}$ but a channel is estimated through a pilot with respect to a degree of freedom of N−M. That is, to ensure a degree of freedom of N−M, a transmission signal uses more symbols than subcarriers. If $(x-1)M \leq (N-M) < xM$, then x subcarriers are further needed. Additionally transmitted symbols serve as a pilot. The receiving end can perform coherent detection through compensation by the precoding matrix $H_{pre}$ at the transmitting end and through channel estimation obtained from the pilot. Alternatively, a pre-equalizer may be changed to have a rank M in consideration of rank deficiency. In this case, an effective dimension of a reception signal in Equation 7 or Equation 8 may be set to M and the pre-equalizer may be designed such that (N−M) equals to 0. The next process is as described previously.

If the number of transmit antennas is larger than the number of receive antennas (M>N), since the precoding matrix $H_{pre}$ of the transmitting end can be designed to satisfy the condition for $\theta_1$ at the receiving end, a transmission signal can be compensated according to a design criterion when M=N.

When such pre-equalization is performed, the receiving end can reduce the transmission amount of additional control information by transmitting feed-forwarding information in the form of predefined codebook information rather than in the form of channel state information, in a frequency division duplex (FDD) environment in which reciprocity of channels as in TDD is difficult to use.

Meanwhile, in transmitting a signal, even though transmission of sequence concept rather than transmission of information of a single symbol unit is attempted, a pilot may be directly defined on a subcarrier or the above-described channel compensation can be performed for each symbol. For channel estimation, a partial or all bands of an OFDM symbol may be allocated as a pilot. However, when transmitting a sequence, since the sequence usually has redundancy, addition of the pilot at the receiving end for channel estimation may be wasteful. Therefore, the receiving end can perform channel estimation using the characteristic of the sequence without allocating the subcarrier or OFDM symbol for channel estimation. As described above, when a transmission sequence is transmitted to the receiving end, the sequence does not need to be used if a channel state can be compensated in the form a specific receive channel.

However, when FDD is used or large amount of channel state information is transmitted, a specific sequence for channel estimation may be transmitted while a signal of each antenna is transmitted. If the state of channels to be transmitted is not discerned, the state of transmitted channels should be able to be estimated so that the receiving end can perform coherent detection. When a signal is transmitted at each antenna, the signal is comprised of a combination of a transmission sequence and a pilot sequence. The receiving end estimates a channel of a received signal using the pilot sequence and compensates for the received signal. Next, a coherent combination with a signal received from another antenna is possible. If the number of transmit antennas is increased, the number of pilot sequences may be increased. At this time, the antennas may use the same pilot sequence. This may be related to whether a sequence to be transmitted is the same or different for each antenna.

The pilot sequence may simply overlap the transmission sequence or may be transmitted as being divided into an I channel and a Q channel. The pilot sequence may be mapped only to a specific constellation position.

A further exemplary embodiment of the present invention improves detection performance through control between devices when multiple devices are related to communication.

Figure 4:
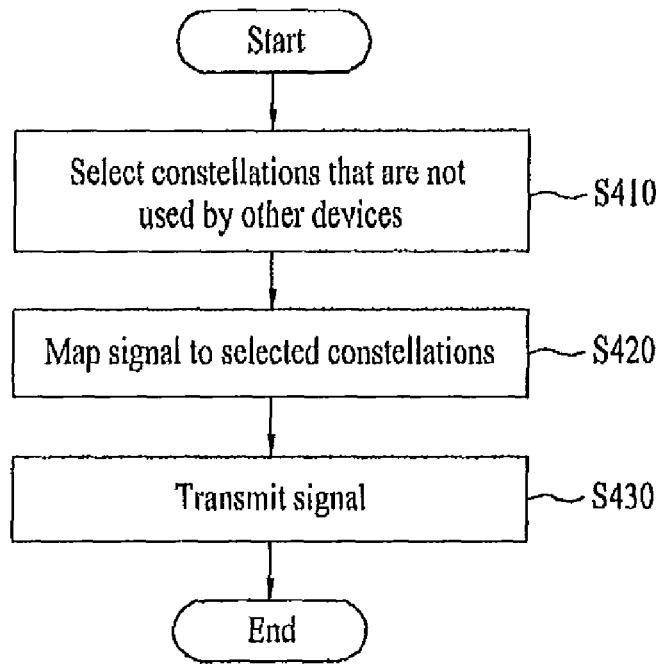
FIG. 4 is a flow chart illustrating a signal transmission method according to a further exemplary embodiment of the present invention.

FIG. 4 is a flow chart illustrating a signal transmission method according to a further exemplary embodiment of the present invention.

It is assumed in FIG. 4 that the receiving end uses more constellations than the transmitting end.

First, constellations are selected which are minimally overlapped with constellations selected by other transmitting ends among constellations used in the receiving end (step S410). A criterion for selecting constellations may use a maximum distance, neighboring constellations, high or low peak-to-average power ratio (PAPA)/cubic metric (CM), a coding scheme, etc. At this time, other devices may select constellations of a number corresponding to a modulation mode thereof among unselected constellations. Although it is desirable to disjoint constellation positions selected by each device, the constellations may be overlapped partially or overall according to environments.

Next, a signal of the transmitting end is mapped to the selected constellations (step S420).

Finally, the mapped signal is transmitted to the receiving end (step S430).

Figure 5:
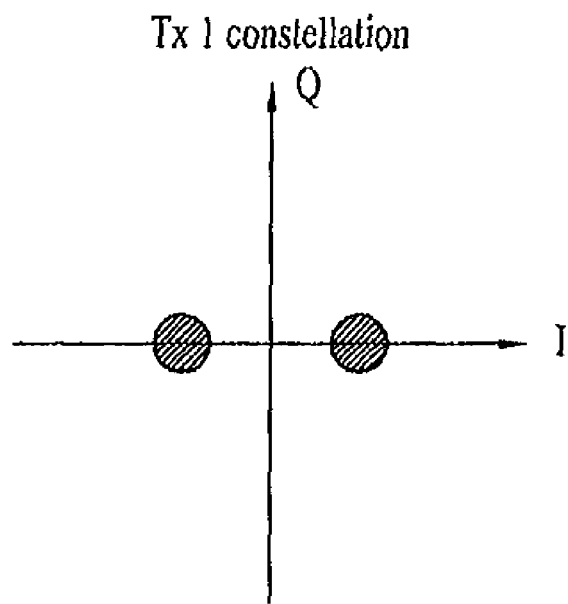
FIGS. 5 and 6 illustrate examples of constellations mapped by different transmitting ends.
Figure 6:
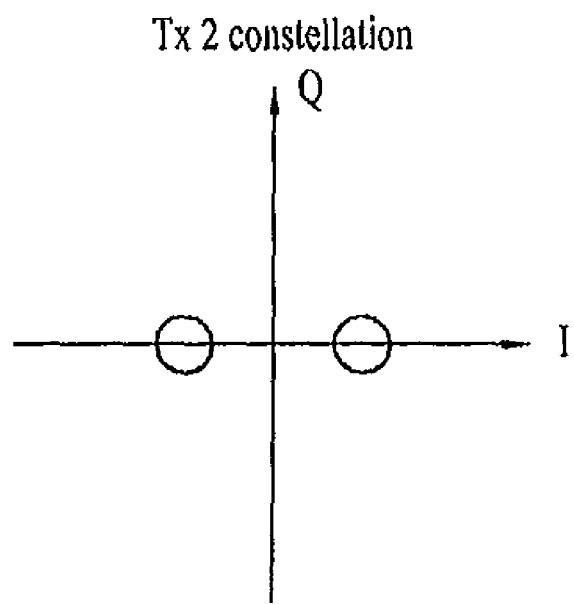

FIGS. 5 and 6 illustrate examples of constellations mapped by different transmitting ends.

As illustrated in FIGS. 5 and 6, if a transmitting end transmits a binary phase shift keying (BPSK) signal, two constellation positions of the BPSK signal may be mapped to specific constellation positions of the receiving end.

Figure 7:
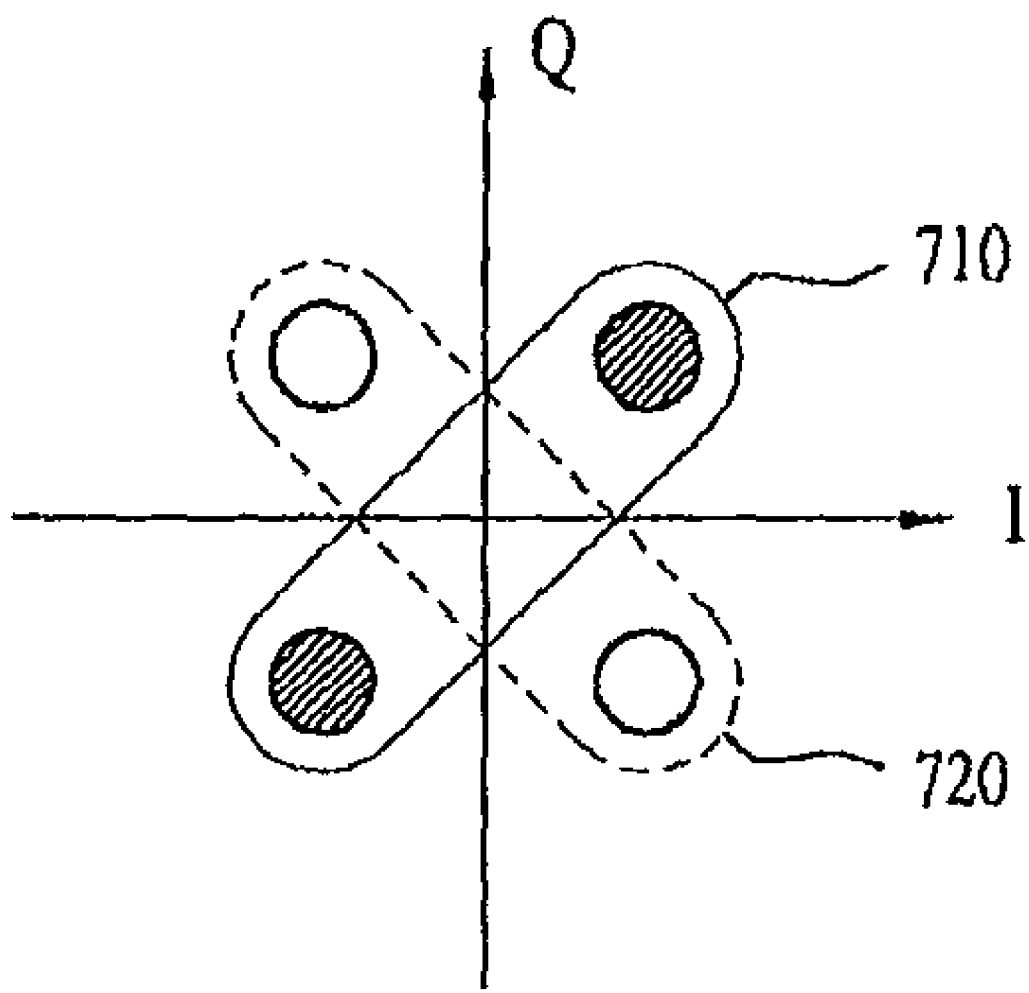
FIG. 7 illustrates an example of a combination of constellations in a constellation mapping process shown in FIG. 4.

FIG. 7 illustrates an example of a combination of constellations in a constellation mapping process shown in FIG. 4.

If a receiving end uses QPSK, each transmitting end can select two constellation positions 710 and 720 among four constellations according to the above-described criterion.

Therefore, when multiple devices simultaneously access the same resource, the receiving end detects signals of specific devices from specific constellations and detects signals of other devices from combinations of other constellations. Such a constellation mapping limit method may be applied to multi-user MIMO using the same resource, or random access or a control channel using a shared resource.

When limiting constellation mapping, the receiving end may reduce an interference level between a specific signal and another signal at one constellation position. If devices arbitrarily select constellations thereof to support constellation mapping, multiple devices may select any combination among constellation combinations by previously determining a specific constellation combination. This is more effective when a symbol form is not determined between a plurality of transmitting ends and a receiving end. This method may be applied to unsolicited traffic such as random access.

If coordination of the receiving end exists, each device of the transmitting end may convert a transmission signal thereof based on constellation mapping determined by the receiving end. If the transmission signal is a sequence, although it is desirable that all sequence symbols be mapped by the same constellation combination, the sequence symbols may have different constellation combinations based on a characteristic of an actual constellation combination. Then a shortcoming of a specific combination can be overcome.

A method for the receiving end to determine constellation mapping may be applied when transmitting a data symbol as well as transmitting a sequence. During transmission of OFDM, a specific mapping method for each subcarrier may be determined. To this end, a specific mapping mode for each subcarrier may be announced. Alternatively, a specific combination index may be announced while previously determining mapping for each subcarrier, so that each device of the transmitting end can select a constellation combination.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

The present invention provides a signal transmission method which can cause a receiving end to perform coherent combination, reduce pilot density, and reduce interference within a cell or between cells. The signal transmission method may be applied to transmission of data or a control signal as well as transmission of a sequence. The signal transmission method is also applicable to communication devices such as a base station or a mobile terminal having multiple antennas.

The invention claimed is:
1. A method for modifying a signal of a transmitting end and transmitting the signal through multiple antennas, comprising:
    upon receiving channel state information from a receiving end:
        estimating, by the transmitting end, a channel according to the channel state information;
        determining, by the transmitting end, a precoding matrix according to the estimated channel; and
        performing, by the transmitting end, pre-equalization by modifying the signal of the transmitting end using the precoding matrix in a process of mapping a symbol of the signal to a subcarrier; and
    transmitting the signal by the transmitting end to the receiving end,
    wherein, when a number of antennas of the receiving end is larger than a number of antennas of the transmitting end, the performing pre-equalization adds at least one of a pilot symbol and a pilot sequence to the signal of the transmitting end,
    wherein the precoding matrix is used to adjust each phase of a part of the signal that is related to the number of antennas of the transmitting end and the at least one of the pilot symbol and the pilot sequence is used for channel estimation of a remaining part of the signal, and wherein the receiving end performs coherent detection of the signal based on the adjusted phase part of the signal and the channel estimation part of the signal.

2. The method according to claim 1, wherein each phase of the signal is adjusted to minimize a phase difference between signals of channels that is caused by the multiple antennas.

3. A method for modifying a signal of a transmitting end and transmitting the signal through multiple antennas, comprising:

estimating, by the transmitting end, a channel according to reciprocity between an uplink channel and a downlink channel of a time division duplex (TDD) system;

determining, by the transmitting end, a precoding matrix according to the estimated channel, and performing, by the transmitting end, pre-equalization by modifying the signal of the transmitting end using the precoding matrix in a process of mapping a symbol of the signal to a subcarrier; and transmitting the signal by the transmitting end to a receiving end, wherein, when a number of antennas of the receiving end is larger than a number of antennas of the transmitting end, the performing pre-equalization adds at least one of a pilot symbol and a pilot sequence to the signal transmitted to the transmitting end, wherein the precoding matrix is used to adjust each phase of a part of the signal that is related to the number of antennas of the transmitting end and the at least one of the pilot symbol and the pilot sequence is used for channel estimation of a remaining part of the signal, and wherein the receiving end performs coherent detection of the signal based on the adjusted phase of the signal and the channel estimation part of the signal.

4. A method for transmitting a signal to a receiving end having more antennas than antennas of a transmitting end, comprising:

upon receiving channel state information from the receiving end:

estimating, by the transmitting end, a channel according to the channel state information;

determining, by the transmitting end, a precoding matrix according to the estimated channel;

performing, by the transmitting end, pre-equalization by modifying a signal to be transmitted to the receiving end using the precoding matrix via a process of mapping a symbol of the signal to a subcarrier; and adding, by the transmitting end, at least one of a pilot symbol and a pilot sequence to the signal; and transmitting the added at least one of the pilot symbol and the pilot sequence through at least one of an I channel and a Q channel together with the signal by the transmitting end to the receiving end, wherein the precoding matrix is used to adjust each phase of a part of the signal that is related to a number of antennas of the transmitting end and the at least one of the pilot symbol and the pilot sequence is used for channel estimation of a remaining part of the signal, and wherein the receiving end performs coherent detection of the signal based on the adjusted phase part of the signal and the channel estimation part of the signal.

5. The method according to claim 4, wherein the adding the at least one of the pilot symbol and the pilot sequence includes adding the pilot symbol to the signal when the signal is comprised of a symbol unit.

6. The method according to claim 4, wherein the adding the at least one of the pilot symbol and the pilot sequence includes adding pilot symbols of a number corresponding to a value obtained by subtracting the number of antennas of the transmitting end from a number of antennas of the receiving end.

7. The method according to claim 4, wherein the adding the at least one of the pilot symbol and the pilot sequence includes adding pilot sequences proportional to the number of antennas of the transmitting end.

8. The method according to claim 4, wherein the adding the at least one of the pilot symbol and the pilot sequence includes mapping the pilot sequence to a specific constellation.

* * * * *